United States Patent [19]

Binger

[11] 4,448,092
[45] May 15, 1984

[54] GEAR TRANSMISSION FOR THE FINAL DRIVE OF HEAVY MOTOR VEHICLES

[75] Inventor: Bernhard Binger, Ravensburg, Fed. Rep. of Germany

[73] Assignee: Zahnradfabrik Friedrichshafen Aktiengesellschaft, Friedrichshafen, Fed. Rep. of Germany

[21] Appl. No.: 181,138

[22] Filed: Aug. 22, 1980

[30] Foreign Application Priority Data

Sep. 1, 1979 [DE] Fed. Rep. of Germany ....... 2935376

[51] Int. Cl.³ ............................................. F16H 57/10
[52] U.S. Cl. ...................................... 74/770; 74/390; 74/606 R; 74/801; 74/397
[58] Field of Search ................. 74/390, 770, 805, 789, 74/801, 606 R, 384, 397; 180/70 R

[56] References Cited

U.S. PATENT DOCUMENTS

| | | | |
|---|---|---|---|
| 788,014 | 4/1905 | Bangs | 74/390 |
| 1,974,230 | 9/1934 | Armington | 74/801 |
| 2,529,330 | 11/1950 | Double | 74/801 |
| 2,543,811 | 3/1951 | Snow | 74/801 |
| 2,647,597 | 8/1953 | Keese | 74/606 |
| 3,001,409 | 9/1961 | Von Fumetti | 74/606 |
| 3,111,852 | 11/1963 | May | 74/606 |
| 3,171,294 | 3/1965 | Mazzarins | 74/801 |
| 3,191,452 | 6/1965 | Lipski et al. | 74/384 |
| 3,387,502 | 6/1968 | Tourneau | 74/801 |
| 3,459,070 | 8/1969 | Holdeman | 74/801 |
| 3,872,939 | 3/1975 | Eckert | 74/606 R |
| 3,901,336 | 8/1975 | Bendure | 180/70 R |
| 3,969,950 | 7/1976 | Rau | 74/801 |
| 4,132,134 | 1/1979 | Avery | 74/801 |
| 4,158,971 | 6/1979 | Szalai | 74/801 |
| 4,186,626 | 2/1980 | Chamberlain | 74/801 |
| 4,191,073 | 3/1980 | Ritter | 74/801 |

FOREIGN PATENT DOCUMENTS

| | | | |
|---|---|---|---|
| 265792 | 1/1968 | Austria . | |
| 2033222 | 1/1972 | Fed. Rep. of Germany . | |
| 2418810 | 10/1975 | Fed. Rep. of Germany | 74/801 |
| 268726 | 5/1950 | Switzerland . | |

OTHER PUBLICATIONS

Endantriebe für schwere Kettenfahrzeuge, published in Sonderdruck aus VDI—Zeitschrift Bd. 11 (1971) Nr. 2, S. 117/22.

Primary Examiner—Allan D. Hermann
Assistant Examiner—Joseph M. Rolnicki
Attorney, Agent, or Firm—Karl F. Ross; Herbert Dubno

[57] ABSTRACT

A gear transmission for the final drive of a heavy automotive vehicle, such as a tracked vehicle, comprises two planar gear sets each having at least one gear rotatably supported on a respective housing part. The two housing parts are rotatable relatively about the axis of a coupling shaft to vary the interaxial spacing of input and output shafts connected to the respective sets and offset from the coupling shaft. This allows the interaxial spacing to be adjusted for various vehicle requirements without varying the transmission ratio.

3 Claims, 5 Drawing Figures

GEAR TRANSMISSION FOR THE FINAL DRIVE OF HEAVY MOTOR VEHICLES

FIELD OF THE INVENTION

The invention relates to a gear transmission for the final drive of heavy motor vehicles, in particular tracked vehicles, of the type in which a hollow wheel has a firm connection with the output shaft and the lands have a firm connection with the housing, and whereby the input and output shafts are arranged in one plane but with the axes offset. Such a "final drive" is usually a step-down transmission between the main or speed-change transmission and the wheel.

BACKGROUND OF THE INVENTION

It is often necessary for the transmission of the final drive to have an extremely large inter-axial or axle offset between input and output shaft, in order to allow the sprocket wheel of a tracked vehicle to extend as far as possible from the frame or the pan or to allow heavy motor vehicles to have as much clearance from the ground as possible (portal axles).

Furthermore relatively large step-down ratios have to be accommodated within a very confined space, taking into consideration the specific conditions of a final drive.

A final drive for a heavy motor vehicle is known from German Patent document No. 24 18 810, in which a hollow wheel is connected with the output shaft and a driving pinion drives this hollow wheel directly as well as indirectly via intermediate gears. With this arrangement two times two intermediate gears are arranged between pinion and hollow wheel, each set being arranged symmetrically to the pinion and hollow wheel in such a way as to achieve load distribution on the indirect drive of the hollow wheel.

The design scope of gear transmissions of this kind is very limited because of the axle offset and transmission ratio parameters, both of which largely dependent upon one another. The size of the hollow wheel is limited by the specific conditions of a final drive (e.g. by the size of the sprocket wheel drum), and there is a limit to the smallness of the driving pinion because it must be dimensioned for the output to be transmitted through the input shaft. Moreover there is not much chance of altering the axle offset without simultaneously altering the transmission ratio. Thus, taking into consideration all these conditions concerning the axle offset, the ratio and the practical possibilities, should the conditions governing the vehicle and the power source give rise to a desire to alter the axle offset this may not at all be possible.

And the possibility of adapting an existing transmission to various motor vehicles with possibly different axle offsets in the final drive is also very remote.

OBJECTS OF THE INVENTION

It is therefore the principal object of the invention to provide an improved gear transmission for the final drive of a motor vehicle, with which it is possible to enlarge the axle offset and to select any desired ratio without it being dependent upon the axle offset, and which may be easily adapted to the varying conditions in different vehicles as regards the axle offset.

SUMMARY OF THE INVENTION

This object is achieved according to the invention in that two sets of gears of the final drive are adjacent to each other, the housing is comprised of two housing portions each associated with one of these sets of gears, and these housing portions may be torsionally displaced in relation to each other and concentrically to the connecting/coupling shaft of these two sets of gears.

By arranging two sets of gears adjacent to each other, it is possible to utilize the axle offset of both sets of gears totaled according to the invention. By varying the positions of the housing portions associated with these sets of gears in relation to each other, the housing portions being torsionally displaceable about the connecting/coupling shaft, the possibility of varying the axle offset from greater than zero to approx. 290 mm has become a reality. Furthermore, this arrangement makes all ratios of practical importance possible, and the axle offset may be varied over the whole range, without interfering with the existing arrangement of the transmission ratio. Thus, no alteration at all is necessary to the layout of the gear sets or to their ratings.

According to the invention both sets of gears are designed as simple planetary standing gears, both planetary standing gears comprise different size planet wheels and the drive is transmitted via a sun wheel or a hollow wheel.

This arrangement of the gear transmission is particularly favourable if both sets of gears have the same layout and the fitted gears are identical. With this arrangement it is possible to achieve not only a relatively large axle offset, but also a large transmission ratio.

Advantageously, one set of gears is designed as a simple planetary standing gear with different size planet wheels, the second set of gears is an open spur gear train with internal toothing, and the drive is transmitted via a pinion/sun wheel or via a hollow wheel.

With this layout—one set of gears consisting of only two wheels—it is nevertheless possible, to achieve an axle offset over a relatively large range and also quite favorable ratio.

In another embodiment one set of gears is designed as a simple planetary standing gear with different size planet wheels, the second set of gears is an open gear train with load distribution, and the drive is transmitted via a pinion/sun wheel or via a hollow wheel.

If, as in this embodiment, one set of gears is designed as an open gear train with load distribution and the second set of gears consists of a planetary standing gear, an extremely large axle offset may be obtained with still acceptable step-down gear ratios.

According to another feature of the invention, the extent to which the housing portions may be torsionally displaced in relation to each other is limited by the construction of the final drive as adapted to the vehicle while the gearing of the final drive as applied in practice can have a one-part housing.

Especially in cases, where a heavy motor vehicle has been developed and the development including the drive (motor) and the final drive according to the invention has been completed thus making any change in the axle offset unlikely, this latter arrangement produces considerable advantages. A common one-part housing for both sets of gears simplifies the manufacture of the final drive without any risk to the advantages of the invention gained during the development phase. This will prove to be of particular value then, when a relatively large number of this type of final drive is required.

Simple open gear trains in connection with simple planetary gear sets whose shafts are arranged coaxially, are generally known and may be used for 200 mm axle offsets and above. But even with this arrangement, any alteration in the axle offset that may become necessary during development, leads, of necessity, to a simultaneous alteration in the ratio, so that the transmission of the final drive has to be completely re-designed.

BRIEF DESCRIPTION OF THE DRAWING

Further details of the invention will now be described with reference to the drawing, in which.

SPECIFIC DESCRIPTION

Figure 1:
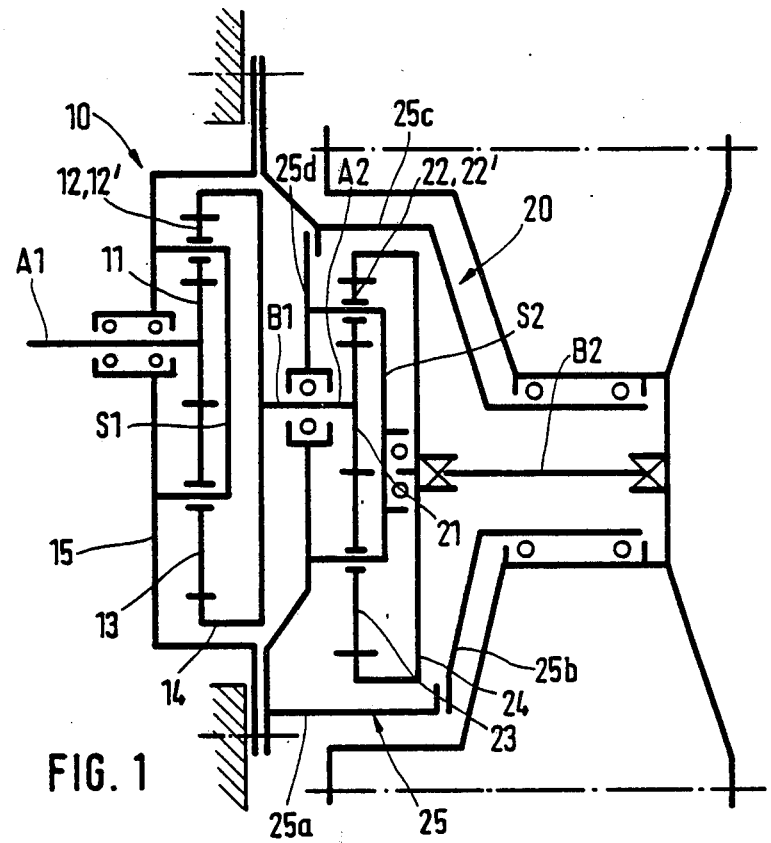
FIG. 1 is a schematic illustration of the gearing according to the invention in one embodiment, employing two planetary standing gears.

FIG. 1 is a schematic illustration of the gear transmission for the final drive according to the invention, of heavy motor vehicles, in particular tracked vehicles. Both sets of gears are designed as simple identical planetary standing gears 10, 20 (i.e. fixed-planet planetary gear transmission). The drive is transmitted via a first input shaft A1 and a first sun wheel 11. Each land or planet carrier S1, S2 is firmly connected with its associated housing portion 15, 25. The planet wheels 12, 12'; 22, 22', which are freely pivotable in the lands S1, S2, are of identical size, but smaller than the large planet wheels 13, and 23, thus creating an axle offset from the input shaft A1 to the output shaft B1 of the first planetary standing gear 10 and also from the input shaft A2 to the output shaft B2 of the second simple planetary standing gear 20. With this arrangement the drive moment is transmitted via the first input shaft A1 and the first sun wheel 11 with load distribution via the small planet wheels 12 and 12' and via the large planet wheel 13 onto the hollow wheel or ring gear 14, and via the first output shaft B1 acting simultaneously as coupling shaft for the two simple planetary standing gears and thus constituting the second input shaft A2 of the associated second simple standing gear 20 onto this gear unit. Load distribution within this second simple planetary standing gear 20 is effected similarly from the second sun wheel 21 via the planet wheels 22, 22' and 23 onto the second hollow wheel or ring gear 24 and thus onto the second output shaft B2 which is also the output shaft of the final drive.

Without altering in any way the transmission ratio of the final drive which is the result of the individual ratios of the respective simple planetary standing gears, the axle offset from the input shaft A1 to the output shaft B2 is obtained by a torsional displacement of the housing portions 15 and 25 in relation to each other about the coupling shaft—output shaft B1/input shaft A2—whereby the axle offset may vary from larger than zero to the totalized axle offset of both planetary standing gears 10, 20.

For various reasons—the assembly for instance—it may be convenient to base the principal construction of the housing portions 15, 25 on a one-part design, as e.g. for housing portion 15, or on a multi-part design, as e.g. for housing portion 25, the illustration showing two variants 25a, 25b and 25c, 25d.

Taking into consideration especially favorable design criteria for the individual planetary standing gears as well as the actually practicable dimensions and the envisaged outputs to be transmitted, one arrives at the following results for the example illustrated in FIG. 1:

| set of gears | direction of rotation | transmission ratio | axle offset a (mm) |
| --- | --- | --- | --- |
| simple planetary standing gear 10 | − | 2.1–3.5 | 30–70 |
| simple planetary standing gear 20 | − | 2.1–3.5 | 30–70 |
| total | + | 4.5–12 | 0–140 |

Figure 2:
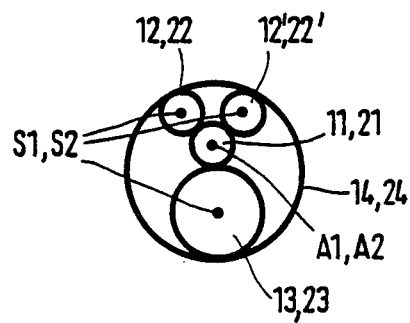
FIG. 2 is a schematic illustration of one set of gears only as per FIG. 1, shown as a side view.

FIG. 2 is a side view of the gear layout of a simple planetary standing gear. The reference numbers are identical with those shown given in FIG. 1.

Figure 3:
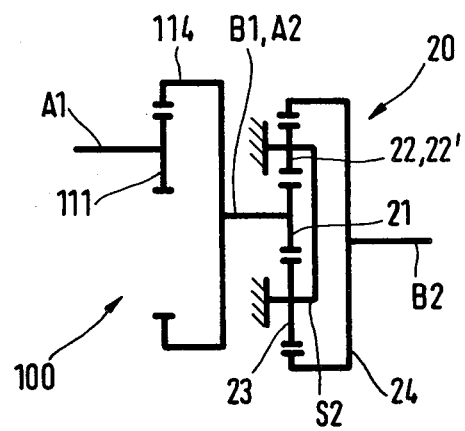
FIG. 3 is a schematic illustration of a gearing comprising an open gear train with internal toothing and a planetary standing gear representing another embodiment.

FIG. 3 shows a further important embodiment of the invention, because one set of gears consists of two wheels only.

The only difference between the gear transmission shown in FIG. 1 and that in FIG. 3 is that one set of gears 100—in this example that situated close to the input shaft A1—consists of a driving pinion 111 and a ring gear 114, with all other conditions remaining the same as those in FIG. 1. With this layout, the direction of rotation is reversed which is, however, not of major importance in view of the many possibilities for altering the entire drive line. The layout according to FIG. 3 gives the following results taking into consideration convenient layout and dimensions as well as the output to be transmitted:

| Set of gears | direction of rotation | transmission ratio | axle offset a (mm) |
| --- | --- | --- | --- |
| open spur gear train with internal toothing | + | 1.5–2 | 50–90 |
| simple planetary standing gear 20 | − | 2.1–3.5 | 30–70 |
| total | − | 3–6 | 20–160 |

Figure 4:
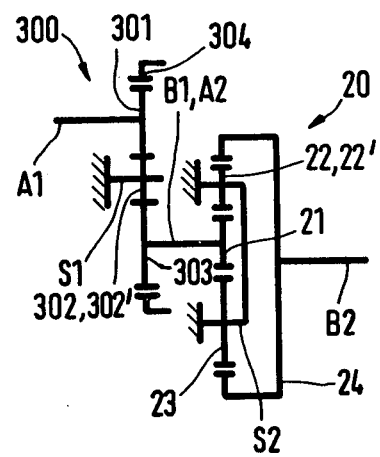
FIG. 4 is a schematic illustration of a gearing comprising an open gear train with load distribution and a planetary standing gear in accordance with yet another embodiment.
Figure 5:
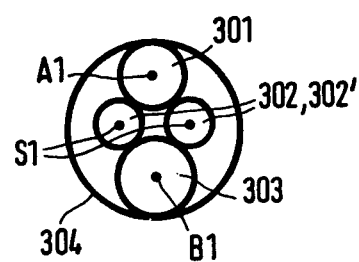
FIG. 5 is a schematic illustration of an open gear train with load distribution as per FIG. 4, shown as a side view.

The two sets of gears coupled as per FIGS. 4 and 5 consist of the already described simple planetary standing gear 20 and an open load distribution gear train 300. This design too leads to favorable step-down ratios, but the most important feature is the fact that an extremely large axle offset is achievable between the input shaft A1 and the output shaft B2 of the final drive. Individual values are given in the following table:

| Set of Gears | direction of rotation | transmission ratio | axle offset a (mm) |
| --- | --- | --- | --- |
| open gear train with load distribution | + | 0.75–1.3 | 150–220 |
| simple planetary standing gear 20 | − | 2.1–3.5 | 30–70 |
| total | − | 1.6–4.6 | 120–290 |

As can be seen from FIGS. 4 and 5, the open gear train comprises a pinion 301 driven by shaft A1 and meshing with a gear 302,302′ having its shaft S1 journaled on an axis which is fixed to the housing part of this set. The gears 302,302′, in turn, mesh with a gear 303 coupled with the shaft B1, A2 providing the input to the planetary set 20 as previously described. A free-running ring gear 304, meshing with the gears 301 and 302/302′ provides load distribution together with the latter gears.

The invention is not limited to the aforementioned examples, but offers the possibility, for instance, to change the order of the sets of gears. Another possibility is that of exchanging the input and output shafts A1, B1 and A2, B2 either on one set of gears or even on both sets of gears.

I claim:

1. A gear transmission forming a final drive in a power train of a heavy automotive vehicle, said gear transmission comprising:

a first set of intermeshing gears lying in a first plane and having an input shaft connected to one gear of said first set and a coupling shaft offset from said input shaft and connected to another gear of said first set;

a second set of intermeshing gears lying in a second plane parallel to said first plane and having said coupling shaft connected to one gear of said second set and an output shaft offset from said coupling shaft and connected to another gear of said second set; and a common housing for both sets of gears having a support part and first and second housing parts respectively assigned to said first and second sets and each rotatably supporting at least one gear of the respective set, at least one of said sets being a planetary standing gear set with planet gears journaled on fixed axes on the respective housing part and interposed between the said one gear and the said other gear of said sets, said housing parts being relatively displaceable angularly about the axis of the coupling shaft and duplicable relative to said support to vary an interaxial spacing of said input and output shafts without changing transmission ratio of said transmission, means being provided to affix said first and second housing parts to said support part.

2. The gear transmission defined in claim 1 wherein both of said sets of intermeshing gears are planetary standing gear sets with respective planet gears journaled on fixed axes on the respective housing parts.

3. The gear transmission defined in claim 1 wherein the other of said intermeshing gear sets is an open gear train.

* * * * *